US 10,860,057 B2

(12) United States Patent
Wu et al.

(10) Patent No.: US 10,860,057 B2
(45) Date of Patent: Dec. 8, 2020

(54) DISPLAY PANEL AND DISPLAY APPARATUS THEREOF

(71) Applicant: Xiamen Tianma Micro-electronics Co., Ltd., Xiamen (CN)

(72) Inventors: Xiaoxiao Wu, Xiamen (CN); Xiai Xu, Xiamen (CN); Bingping Liu, Xiamen (CN); Guozhao Chen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 25 days.

(21) Appl. No.: 16/014,514

(22) Filed: Jun. 21, 2018

(65) Prior Publication Data
US 2019/0265754 A1   Aug. 29, 2019

(30) Foreign Application Priority Data
Feb. 26, 2018   (CN) .......................... 2018 1 0159042

(51) Int. Cl.
*G06F 1/16* (2006.01)
(52) U.S. Cl.
CPC .......... *G06F 1/1626* (2013.01); *G06F 1/1605* (2013.01); *G02F 2201/56* (2013.01)
(58) Field of Classification Search
CPC .... G06F 1/1626; G06F 1/1605; G06F 1/1601; G06K 9/00; G06K 9/00087
See application file for complete search history.

(56) References Cited

U.S. PATENT DOCUMENTS

| | | | |
|---|---|---|---|
| 2008/0088765 A1* | 4/2008 | Hashimoto | G02F 1/1333 349/58 |
| 2009/0257189 A1* | 10/2009 | Wang | H04M 1/0249 361/679.56 |
| 2010/0273530 A1* | 10/2010 | Jarvis | F16F 1/027 455/566 |
| 2012/0105400 A1* | 5/2012 | Mathew | H04N 5/2251 345/207 |
| 2016/0042217 A1* | 2/2016 | Kim | G06F 3/041 382/124 |
| 2016/0260406 A1* | 9/2016 | Seen | G02B 6/0068 |
| 2016/0349439 A1* | 12/2016 | Park | G02B 6/0053 |
| 2017/0004798 A1* | 1/2017 | Park | G09G 3/3648 |
| 2017/0287992 A1* | 10/2017 | Kwak | H04M 1/0264 |
| 2017/0289324 A1* | 10/2017 | Yeo | G06F 1/1637 |
| 2018/0059512 A1* | 3/2018 | Rho | G03B 17/06 |
| 2018/0158417 A1* | 6/2018 | Xiang | G09G 3/3233 |

(Continued)

FOREIGN PATENT DOCUMENTS

| | | |
|---|---|---|
| CN | 203433222 U | 2/2014 |
| CN | 105527739 A | 4/2016 |

(Continued)

*Primary Examiner* — Jia X Pan
(74) *Attorney, Agent, or Firm* — Anova Law Group PLLC

(57) ABSTRACT

A display panel and a display apparatus thereof are provided. An exemplary display panel includes a display region and a non-display region surrounding the display region. The non-display region includes at least one first groove and a bonding region. Along a thickness direction of the display panel, the at least one first groove penetrates through the display panel. The at least one first groove and the bonding region are disposed at a same side of the display region.

14 Claims, 9 Drawing Sheets

(56) References Cited

U.S. PATENT DOCUMENTS

| | | | | |
|---|---|---|---|---|
| 2018/0307270 A1* | 10/2018 | Pantel | ................... | G06F 1/1605 |
| 2019/0155502 A1* | 5/2019 | Zhang | ................... | G01S 7/4813 |
| 2019/0196248 A1* | 6/2019 | Cheng | ................... | G06F 1/1637 |
| 2019/0246018 A1* | 8/2019 | Rho | ......................... | G03B 9/02 |

FOREIGN PATENT DOCUMENTS

| CN | 105872137 A | 8/2016 |
|---|---|---|
| CN | 105979696 A | 9/2016 |
| CN | 106210182 A | 12/2016 |
| CN | 206164627 U | 5/2017 |
| CN | 106817451 A | 6/2017 |
| CN | 107340661 A | 11/2017 |
| CN | 107561806 A | 1/2018 |
| CN | 107731886 A | 2/2018 |

\* cited by examiner

US 10,860,057 B2

DISPLAY PANEL AND DISPLAY APPARATUS THEREOF

CROSS-REFERENCES TO RELATED APPLICATIONS

This application claims priority of Chinese Patent Application No. 201810159042.8, filed on Feb. 26, 2018, the entire contents of which are hereby incorporated by reference.

FIELD OF THE INVENTION

The present disclosure generally relates to the field of display technology and, more particularly, relates to a display panel and a display apparatus thereof.

BACKGROUND

In a terminal display apparatus, various units, such as a camera, a microphone and a fingerprint identification unit, etc., are often desired to be installed. These units are desired to be placed by avoiding the position of the display panel. Thus, the non-display region of the display apparatus is substantially large, which may not be favorable for realizing a full screen and may degrade the user experience of the terminal display apparatus.

The disclosed display panel and display apparatus are directed to solve one or more problems set forth above and other problems in the art.

BRIEF SUMMARY OF THE DISCLOSURE

One aspect of the present disclosure provides a display panel. The display panel includes a display region and a non-display region surrounding the display region. The non-display region includes at least one first groove and a bonding region. Along a thickness direction of the display panel, the at least one first groove penetrates through the display panel. The at least one first groove and the bonding region are disposed at a same side of the display region.

Another aspect of the present disclosure provides a display apparatus. The display apparatus includes a display panel. The display panel includes a display region and a non-display region surrounding the display region. The non-display region includes at least one first groove and a bonding region. Along a thickness direction of the display panel, the at least one first groove penetrates through the display panel. The at least one first groove and the bonding region are disposed at a same side of the display region.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
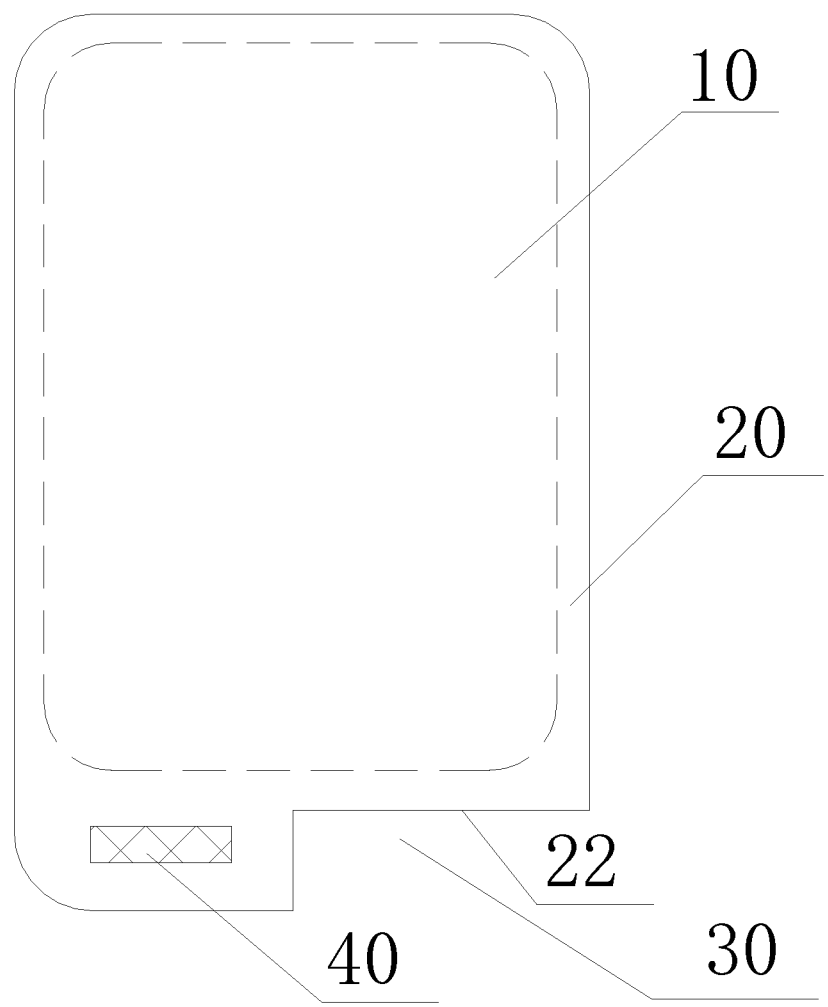
FIG. 1 illustrates a front view of an exemplary display panel consistent with various disclosed embodiments.

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present disclosure. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

The techniques, methods and apparatus that are familiar to the persons of ordinary skill in the art may not be described in detail. However, under appropriate conditions, such techniques, methods and apparatus are included as the parts of the description.

In the disclosed embodiments, the specific values should be explained for illustrative purposes only and should not be used as limitations. Thus, some other embodiments may have different values.

Further, the similar symbols and letters in the drawings denote similar elements. Thus, once one element is defined in one drawing, it may not need to be defined in the following drawings.

The present disclosure provides a display panel with an improved screen-to-body ratio.

FIG. 1 illustrates an exemplary display panel consistent with various disclosed embodiments. As shown in FIG. 1, the display panel may include a display region 10 and a non-display region 20 surrounding the display region 10. The non-display region 20 may include at least one first groove30. Along a thickness direction of the display panel (i.e., a direction perpendicular to the image displaying surface of the display panel), the at least one first groove 30 may penetrate through the display panel. The non-display region 20 may also include a bonding region 40. The first groove 30 and the bonding region 40 may be disposed at a same side of the display region 10.

In the disclosed embodiments, the display panel 001 may be a plasma display panel, a field emission display panel, a light-emitting diode (LED) display panel, an organic light-emitting diode (OLED) display panel, a liquid crystal display panel, a quantum dots (QDs) display panel, an electrophoretic display panel, etc. Further, the display panel may include any appropriate type of display panels which are not limited by the present disclosure.

In one embodiment, referring to FIG. 1, the present disclosure provides a display panel, the display panel includes a display region 10 and a non-display region 20. A first groove 30 and a bonding region 40 may be disposed in the non-display region 20. The first groove 30 and the bonding region 40 may be located at a same side of the display region 10, and may be isolated.

In particular, the bonding region 40 may provide a clearance space for the first groove 30. For example, the bonding region 40 may not occupy the space of the first groove 30, and the position of the bonding region 40 may be away from a middle position of one side of the display panel. For example, referring to FIG. 1, when the bonding region 40 is disposed at left of the center, and the first groove 30 may be disposed at the right of the center. When the display panel is installed in a terminal display apparatus, certain units, such as a camera and/or a headphone, etc., may be installed in the region where the first groove 30 is located. Thus, the space of the non-display region 20 below the display region 10 may be effectively utilized, which may maximize the area of the display region 10. Accordingly, the screen-to-body ratio of the terminal display apparatus in which the display panel is installed may be increased.

Further, the present disclosure provides another display panel. As shown in FIG. 1, the display panel may include a second border 22. The second border 22 may be recessed towards the inside of the display panel to form the first groove 30.

Further, referring to FIG. 1, the display panel may include a display region 10 and a non-display region 20. One first groove 30 may be disposed on the non-display region 20. FIG. 1 shows only one first groove 30 is disposed in the display panel, which is for illustrative purposes and is not intended to limit the scope of the present disclosure. The display panel may include any appropriate number of first grooves 30. The first groove 30 and the bonding region 40 may be located at a same side of the display region 10, and the first groove 30 may be formed by recessing the second border 22 towards the inside of the display panel.

Figure 2:
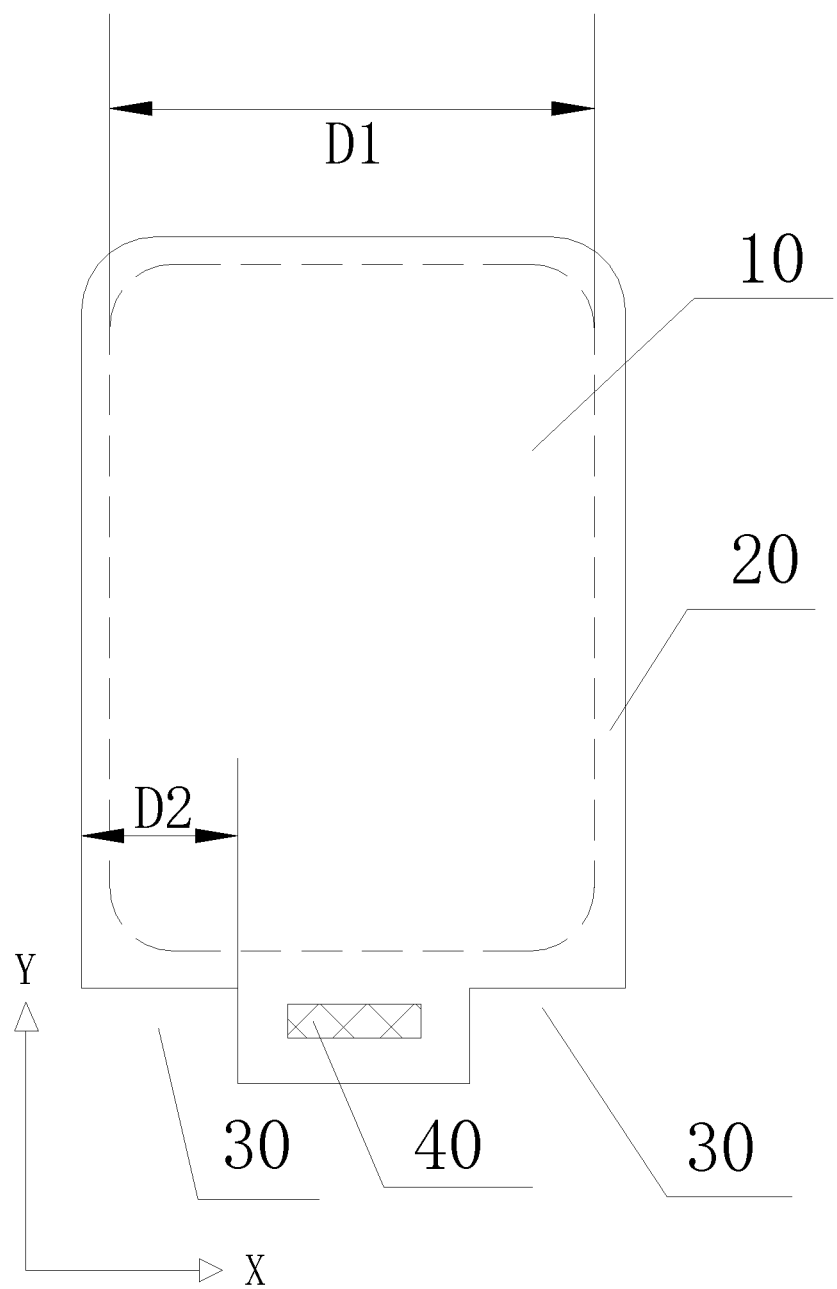
FIG. 2 illustrates a front view of another exemplary display panel consistent with various disclosed embodiments.

FIG. 2 illustrates a front view of another exemplary display panel consistent with various disclosed embodiments. In one embodiment, as shown in FIG. 2, the display region 10 may include two first grooves 30. Along a first direction X, the bonding region 40 may extend as a stripe. The two grooves 30 may be disposed at a first side of the bonding region 40 and a second side of the bonding region 40, respectively. Along the first direction X, the first side of the bonding region 40 and the second side of the bonding region 40 may be arranged opposite to each other.

In particular, as shown in FIG. 2, the display panel may include a display region 10 and a non-display region 20. Two first grooves 30 may be disposed on the non-display region 20. The two first grooves 30 may be disposed at the first side of the bonding region 40 and the second side of the bonding region 40, respectively. The first grooves 30 and the bonding region 40 may be isolated.

The bonding region 40 may provide a clearance space for the two first grooves 30, and the bonding region 40 may not occupy the space of the first grooves 30. For example, the bonding region 40 may be disposed at a middle position of one side of the display panel, referring to FIG. 2, when the bonding region 40 is disposed at middle position, and the two first grooves 30 may be disposed at two sides of the middle position. The position of the bonding region 40 may have more freedom to be determined, which may not be limited to be disposed at one side of the display panel. When the display panel is installed in a terminal display apparatus, certain units, such as a camera, and a headphone, etc., may be disposed in the two regions where the two first grooves 30 are located, respectively. Thus, the space of the non-display region 20 below the display region 10 may be effectively utilized, and the screen-to-body ratio of the display apparatus where the display panel is installed may be increased.

Figure 3:
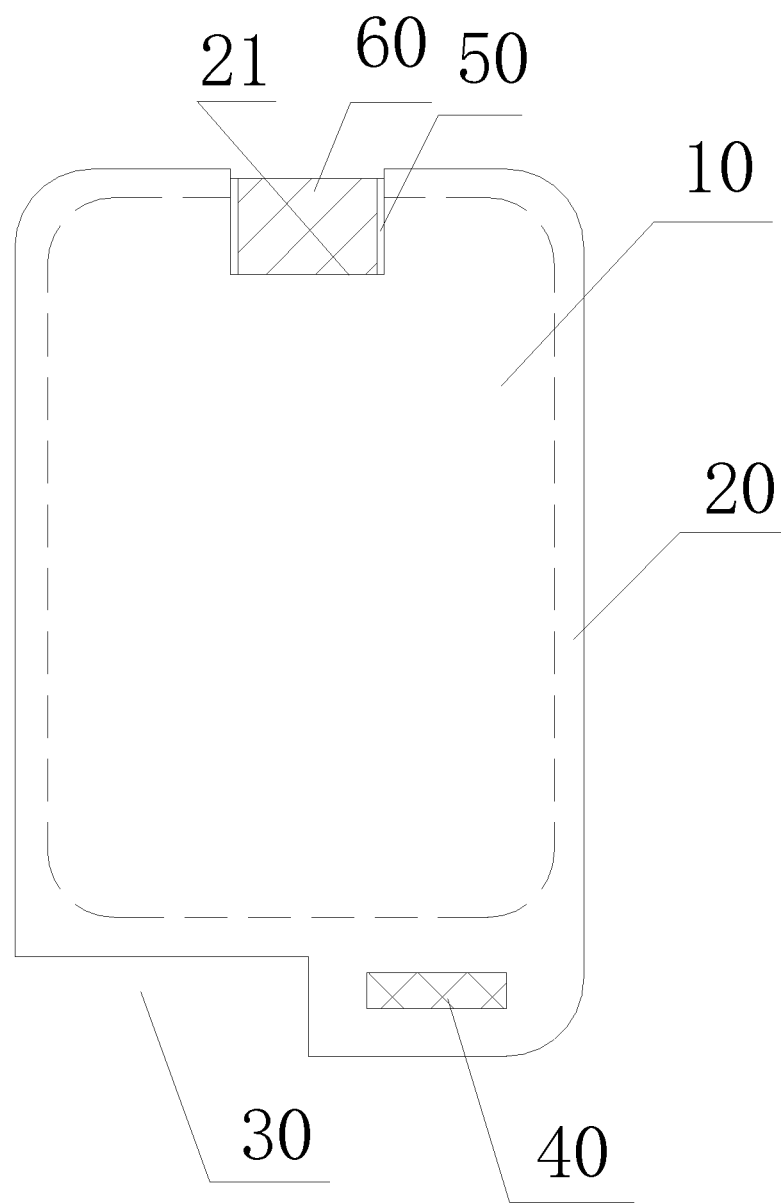
FIG. 3 illustrates a back view of another exemplary display panel consistent with various disclosed embodiments.

FIG. 3 illustrates a back view of another exemplary display panel consistent with various disclosed embodiments. As shown in FIG. 3, the display panel may also include a second groove 50. At least a portion of the second groove 50 may be covered by the display region 10. That is, the second groove 50 may be at least partially covered by the display region 10. The second groove 50 may include a fingerprint identification unit 60.

In particular, referring to FIG. 3, the display panel may include a display region 10 and a non-display region 20. At least one first groove 30 may be disposed on the non-display region 20. The number of the first grooves 30 is not limited by the present disclosure. A bonding region 40 may also be disposed on the non-display region 20. The first groove 30 and the bonding region 40 may be located at a same side of the display region 10. The display panel may also include a second groove 50.

When the display panel is installed in a terminal display apparatus. Certain units, such as a camera and/or a headphone, etc., may be disposed in the region where the first groove 30 is located. Thus, the non-display region 20 below the display region 10 may be effectively utilized, which may maximize the display region 10. The display panel may also include the second groove 50. The second groove 50 may include the fingerprint identification unit 60, and the second groove 50 may be partially enclosed by the display region 10. Correspondingly, the fingerprint identification unit 60 may be partially enclosed by the display region 10. Thus, the fingerprint identification region 60 may be no longer directly disposed in the non-display region 20 of the display panel, and the occupied area of the fingerprint identification region 60 in the non-display region 20 may be reduced. Accordingly, the area of the non-display region 20 may be reduced, which may facilitate to achieve a full screen.

In the disclosed embodiments, through introducing the first groove 30 and the second groove 50, the screen-to-body ratio of the display apparatus where the display panel is installed may be improved, and the overall appearance of the display panel may be enhanced.

Figure 4:
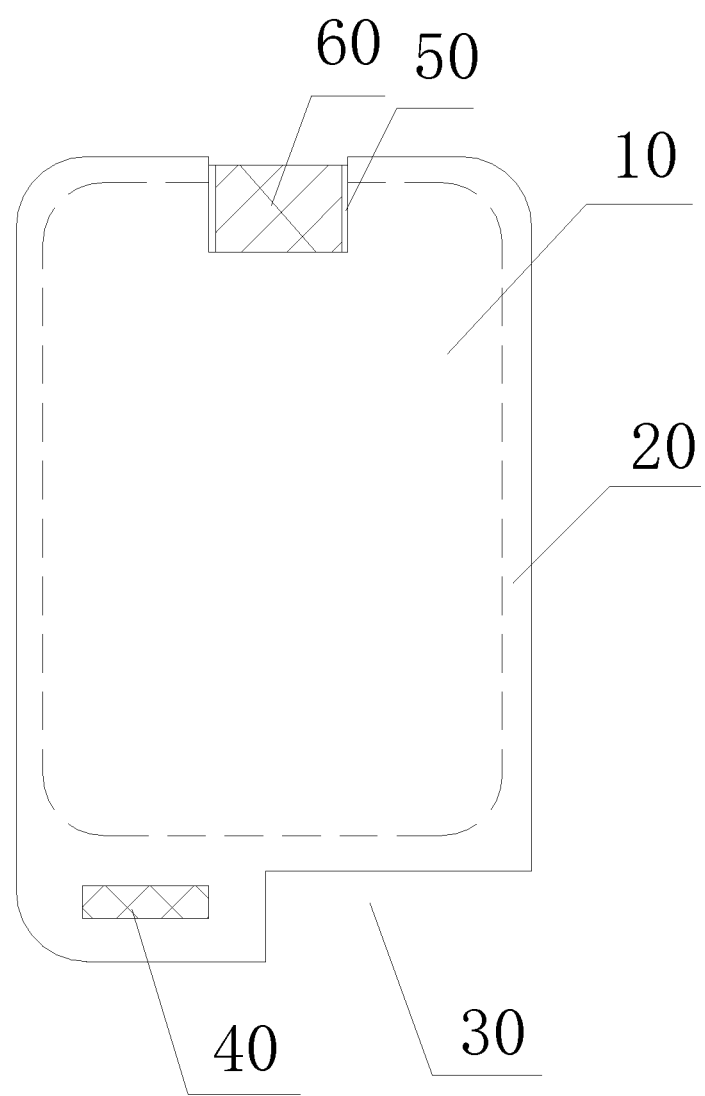
FIG. 4 illustrates a front view of another exemplary display panel consistent with various disclosed embodiments.

FIG. 4 illustrates a front view of another exemplary display panel consistent with various disclosed embodiments. As shown in FIG. 4 and FIG. 3, along the thickness direction of the display panel, the second groove 50 may penetrate through the display panel. The fingerprint identification unit 60 may be embedded in the second groove 50.

The display panel may include a display region 10 and a non-display region 20. A least one first groove 30 may be disposed on the non-display region 20. The number of the first grooves 30 is not limited by the present disclosure. A bonding region 40 may also be disposed on the non-display region 20. The first groove 30 and the bonding region 40 may be disposed at a same side of the display region 10. The display panel may also include a second groove 50. Along the thickness direction of the display panel, the second groove 50 may penetrate through the display panel, and the fingerprint identification unit 60 may be embedded in the second groove 50.

When the display panel is installed in a terminal display apparatus, certain units, such as a camera and/or a headphone, etc., may be disposed in the region where the first groove 30 is located. Thus, the non-display region 20 below the display region 10 may be effectively utilized, which may maximize the display region 10. The fingerprint identification unit 60 and the display panel may be formed separately, and then assembled together. The fingerprint identification unit 60 may be embedded in the second groove 50 of the display panel, such that extra film structures may not be introduced to the display panel, and the process difficulty for fabricating the display panel may be reduced. Further, the fingerprint identification region 60 may be no longer directly disposed in the non-display region 20 of the display panel, and the occupied area of the fingerprint identification region 60 in the non-display region 20 may be reduced. Accordingly, the area of the non-display region 20 may be reduced, which may facilitate to achieve a full screen.

Figure 5:
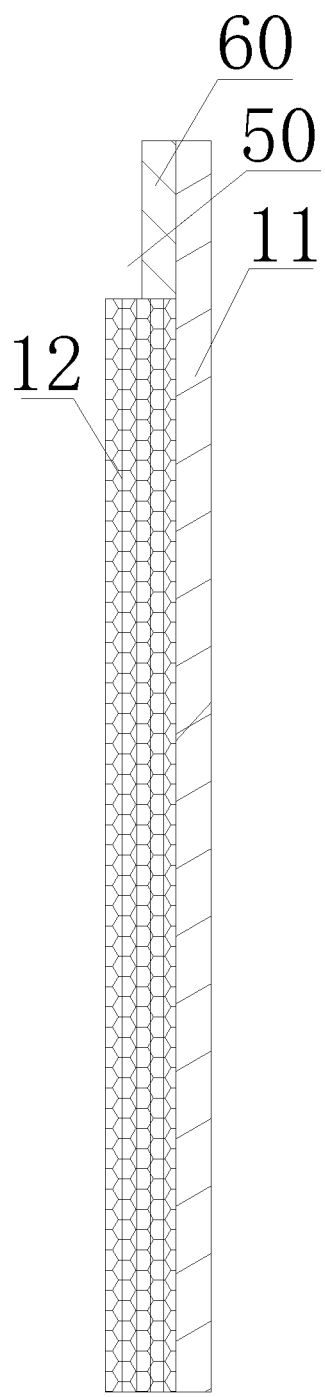
FIG. 5 illustrates a cross-sectional view of another exemplary display panel consistent with various disclosed embodiments.

FIG. 5 illustrates a cross-sectional view of another exemplary display panel consistent with various disclosed embodiments. As shown in FIG. 5 and FIG. 3, the display panel may include a base substrate 11 and a multiple-layer structure 12 which includes a plurality of film layers 12 disposed on the base substrate 11. Along a thickness direction of the display panel, the second groove 50 may penetrate through at least a portion of the multiple-layer structure 12. The fingerprint identification unit 60 may be integrated in the region where the second groove 50 is disposed.

In particular, referring to FIG. 3 and FIG. 5, the display panel may include a display region 10 and a non-display region 20. A least one first groove 30 may be disposed on the non-display region 20. The number of the first grooves 30 is not limited by the present disclosure. A bonding region 40 may also be disposed on the non-display region 20. The first groove 30 and the bonding region 40 may be disposed at a same side of the display region 10. The display panel may also include a second groove 50. Along the thickness direction of the display panel, the second groove 50 may penetrate through the multiple-layer structure 12. The fingerprint identification unit 60 may be directly formed in the region of the display panel where the second groove 50 is disposed.

When the display panel is installed in a terminal display apparatus. Certain units, such as a camera and/or a headphone, etc., may be disposed in the region where the first groove 30 is disposed. Thus, the non-display region 20 below the display region 10 may be effectively utilized, which may maximize the display region 10. The fingerprint identification unit 60 may be formed in the region of the base substrate 11 where the second groove 50 is disposed. Thus, the fingerprint identification unit 60 and the display panel may be no longer individually formed and then assembled together and, accordingly, the process for assembling the fingerprint identification unit 60 and the display panel may be simplified. At the same time, the fingerprint identification unit 60 may not occupy any of the display region 10. Thus, the screen-to-body ratio of the display apparatus where the display panel is disposed may be increased, which may facilitate to achieve a full screen.

Referring to FIG. 3, the present disclosure also provides another display panel. In one embodiment, the display panel may include a first border 21, and the first border 21 may be recessed towards the inside of the display panel to form a second groove 50. The second groove 50 may be partially enclosed by the display region 10.

In particular, referring to FIG. 3, the display panel may include a display region 10 and a non-display region 20. A least one first groove 30 may be disposed on the non-display region 20. FIG. 3 shows only one first groove 30 is disposed in the display panel, which is for illustrative purposes and is not intended to limit the scope of the present disclosure. The display panel may include any appropriate number of the first grooves 30. A bonding region 40 may also be disposed on the non-display region 20. The first groove 30 and the bonding region 40 may be disposed at a same side of the display region 10. The display panel may also include a second groove 50. The second groove 50 may be formed by recessing the first border 21 towards the inside of the display panel.

Figure 6:
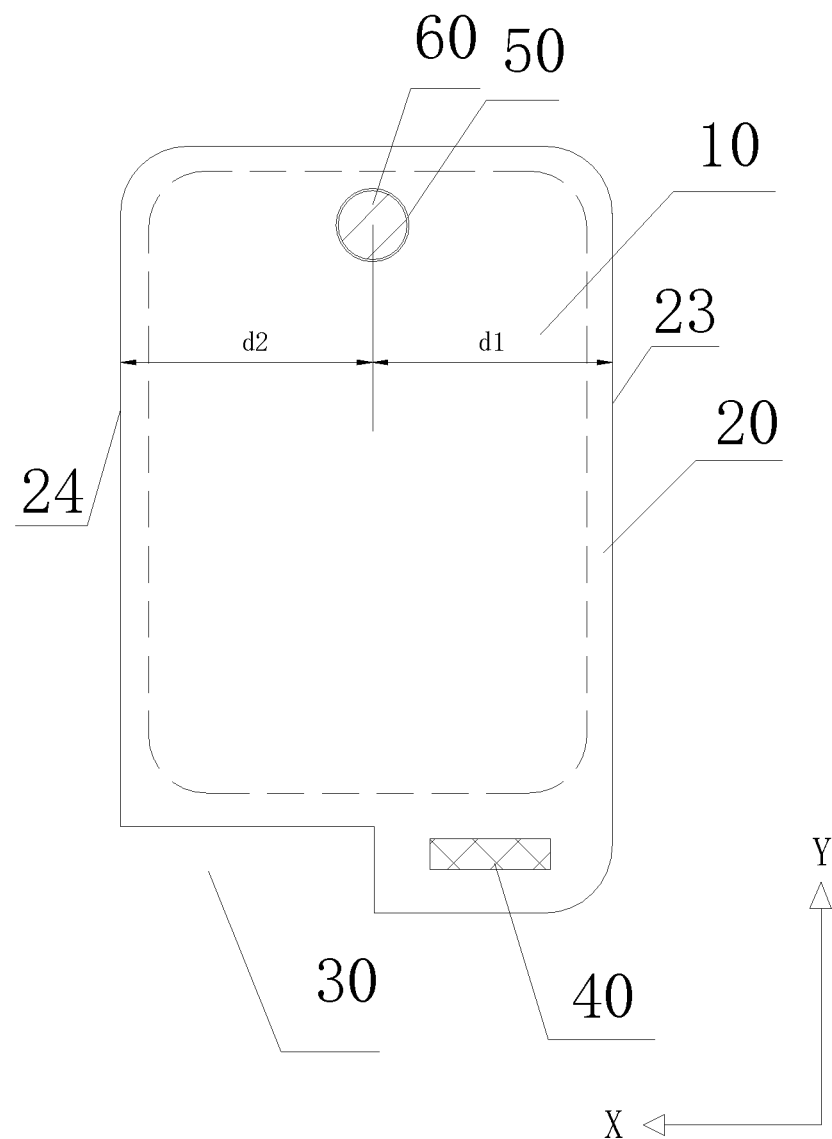
FIG. 6 illustrates a back view of another exemplary display panel consistent with various disclosed embodiments.

FIG. 6 illustrates a back view of another exemplary display panel consistent with various disclosed embodiments. As shown in FIG. 6, the entire second groove 50 may be disposed in the display region 10.

In particular, referring to FIG. 6, the display panel may include a display region 10 and a non-display region 20. A least one first groove 30 may be disposed on the non-display region 20. FIG. 6 shows only one first groove 30 is disposed in the display panel, which is for illustrative purposes and is not intended to limit the scope of the present disclosure. The display panel may include any appropriate number of the first grooves 30. A bonding region 40 may also be disposed on the non-display region 20. The first groove 30 and the bonding region 40 may be disposed at a same side of the display region 10. The display panel may also include a second groove 50, and the entire second groove 50 may be disposed in the display region 10. The second groove 50 may include a fingerprint identification unit 60. The fingerprint identification unit 60 may be embedded in the second groove 50, or may be integrated in the region of the display panel where the second groove 50 is disposed.

When the display panel is installed in a terminal display apparatus. Certain units, such as a camera and/or a headphone, etc., may be disposed in the region where the first groove 30 is disposed. Thus, the non-display region 20 below the display region 10 may be effectively utilized, which may maximize the display region 10, and the screen-to-body ratio of the display apparatus where the display panel is installed may be increased. The entire second groove 50 may be disposed in the display region 10, and the second body groove 50 may include the fingerprint identification unit 60. Thus, the fingerprint identification unit 60 may be disposed within the second groove 50. At the same time, the second groove 50 may not affect the size of the display region 10, which may facilitate to achieve a full screen.

Referring to FIG. 6, the present disclosure also provides another display panel. In one embodiment, along a first direction X, the display panel may include a first border 23 and an opposing second border 24. A distance between the second groove 50 and the first border 23 is d1. A distance between the second groove 50 and the second border 24 is d2. Wherein d1=d2 or d1<d2, d1>0, and d2>0.

In particular, referring to FIG. 6, a distance between the second groove 50 and the first border 23 is d1. A distance between the second groove 50 and the second border 24 is d2. The position of the second groove 50 on the display panel may meet the conditions: d1=d2 or d1<d2, d1>0, and d2>0. FIG. 6 only illustrates one exemplary position of the second groove 50 on the display panel, and it is not intended to limit the position of the second groove 50 on the display panel. The second groove 50 may be disposed on any appropriate position of the display panel.

Figure 7:
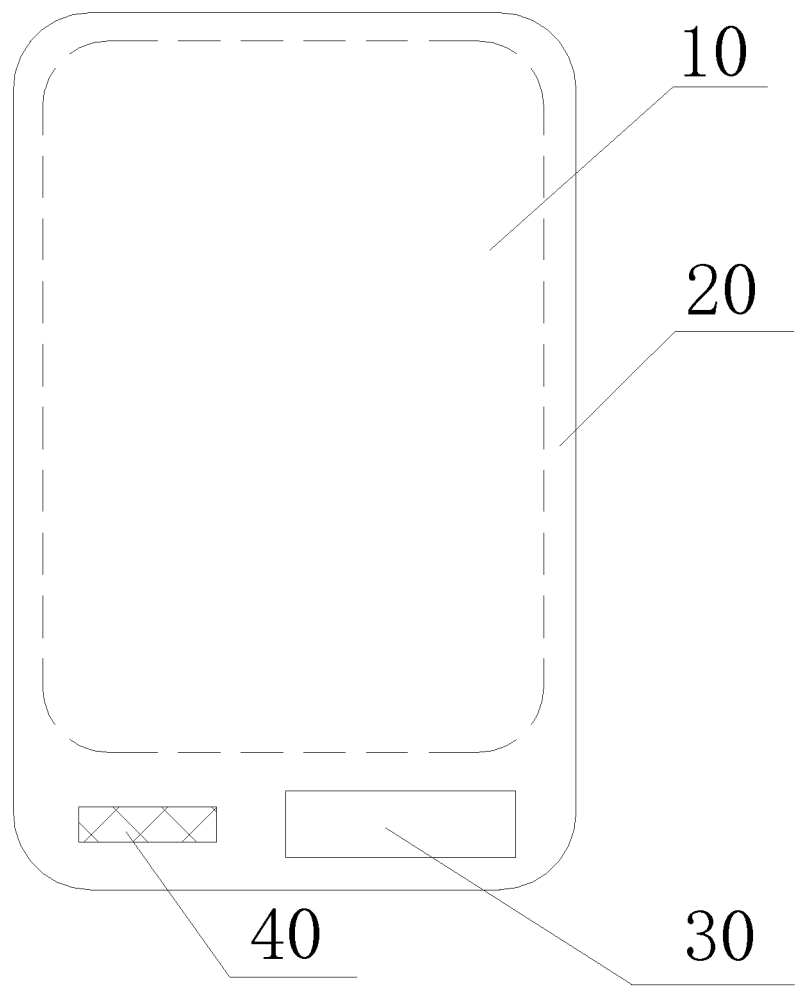
FIG. 7 illustrates a front view of another exemplary display panel consistent with various disclosed embodiments.

FIG. 7 illustrates another exemplary display panel consistent with various disclosed embodiments. In one embodiment, as shown in FIG. 7, the first groove 30 may be enclosed by the non-display region 20.

In particular, referring to FIG. 7, the display panel may include a display region 10 and a non-display region 20. A first groove 30 may be disposed on the non-display region 20. FIG. 7 shows only one first groove 30 is disposed in the display panel, which is for illustrative purposes and is not intended to limit the scope of the present disclosure. The display panel may include any appropriate number of the first grooves 30. A bonding region 40 may also be disposed on the non-display region 20. The first groove 30 and the bonding region 40 may be disposed at a same side of the display region 10. The first groove 30 may be enclosed by the display region 20.

Referring to FIG. 2, the present disclosure provides another display panel. In one embodiment, the bonding region 40 may extend along the first direction X. The width of the display region 10 along the first direction X is D1, and the width of the first groove 30 is D2. Where $20\%*D1 \leq D2 \leq 60\%*D1$.

In particular, as shown in FIG. 2, the display panel may include a display region 10 and a non-display region 20. Two first grooves 30 may be disposed on the non-display region 20. FIG. 2 shows only two first grooves 30 are disposed in the display panel, which is for illustrative purposes and is not intended to limit the scope of the present disclosure. The display panel may include any appropriate number of the first grooves 30. A bonding region 40 may be disposed in the non-display region 20. The first grooves 30 and the bonding region 40 may be disposed at a same side of the display region 10. Along the first direction X, the width of the display region 10 is D1, and the width of the first groove 30 is D2. The width of the display region 10 and the width of the first groove 30 may match the condition: $20\%*D1 \leq D2 \leq 60\%*D1$. The width of the first groove 30 may be in an appropriate range. When the width of the first groove 30 is substantially large, the disposition of the bonding region 40 in the circuit structure may not be facilitated. When the width of the first groove 30 is substantially small, the disposition of certain electrical devices, such as headphone and/or camera, etc., in the terminal display apparatus may not be facilitated.

Figure 8:
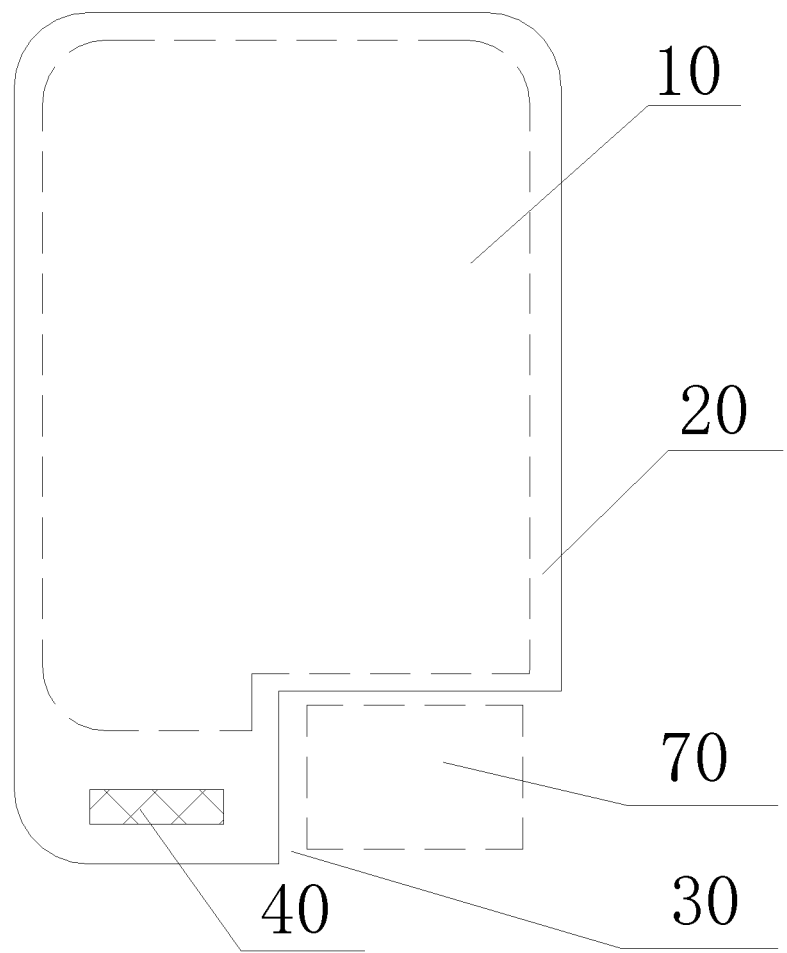
FIG. 8 illustrates a front view of another exemplary display panel consistent with various disclosed embodiments.

FIG. 8 illustrates a front view of another exemplary display panel consistent with various disclosed embodiments. In one embodiment, as shown in in FIG. 8, the display panel may include a recessed region 70. The display region 10 may be recessed towards the inside of the display region 10 in the recessed region 70. The display region 10 may include a first side adjacent the first groove 30 and an opposing second side far away from the first groove 30. The recessed region 70 may be disposed at the first side of the display region 10.

In particular, referring to FIG. 8, the display panel may include a display region 10 and a non-display region 20. A first groove 30 may be disposed on the non-display region 20. FIG. 8 shows only one first groove 30 is disposed in the display panel, which is for illustrative purposes and is not intended to limit the scope of the present disclosure. The display panel may include any appropriate number of the first grooves 30. A bonding region 40 may be disposed on the non-display region 20. The first groove 30 and the bonding region 40 may be disposed at a same side of the display region 10. The display panel may also include a recessed region 70. The display region 10 may be recessed towards the inside of the display region 10 in the recessed region 70. The recessed region 70 may effectively increase the space of the first groove 20 to match the requirements of the modules including the camera and the headphone, etc. for large spaces. Thus, the portion of the non-display region 20 below the display region 10 may be effectively utilized, which may facilitate to maximize the display region 10, and the screen-to-body ratio of the display panel where the display panel is installed may be increased.

Referring to FIG. 1, the present disclosure also provides another display panel. In one embodiment, the shape of the first groove 30 may be one of a circle, an ellipse and a quadrangle.

In particular, as shown in FIG. 1, the display panel may include a display region 10 and a non-display region 20. A first groove 30 may be disposed on the non-display region 20. FIG. 1 shows only one first groove 30 is disposed in the display panel, which is for illustrative purposes and is not intended to limit the scope of the present disclosure. The display panel may include any appropriate number of the first grooves 30. A bonding region 40 may also be disposed on the non-display region 20. The first groove 30 and the bonding region 40 may be disposed at a same side of the display region 10. The shape of the first groove 30 may be one of a circle, an ellipse and a quadrangle. The first groove 30 may be any appropriate shape. The shape of the first groove 30 may be selected according to the specific design of the display panel, and is not limited by the present disclosure.

Referring to FIG. 3, the present disclosure also provides another display panel. In one embodiment, the shape of the second groove 50 may be one of a circle, an ellipse and a quadrangle.

In particular, as shown in FIG. 3, the display panel may include a display region 10 and a non-display region 20. A first groove 30 may be disposed on the non-display region 20. FIG. 3 shows only one first groove 30 is disposed in the display panel, which is for illustrative purposes and is not intended to limit the scope of the present disclosure. The display panel may include any appropriate number of the first grooves 30. A bonding region 40 may also be disposed in the non-display region 20. The first groove 30 and the bonding region 40 may be disposed at a same side of the display region 10. The display panel may also include a second groove 50. The shape of the second groove 50 may be one of a circle, an ellipse and a quadrangle. The second groove 50 may be any appropriate shape. The shape of the second groove 50 may be selected according to the specific design of the display panel, and is not limited by the present disclosure.

In one embodiment, the fingerprint identification unit 60 may include a plurality of fingerprint identification electrodes. In another embodiment, the fingerprint identification unit 60 may include a plurality of optical sensitive diodes.

The fingerprint identification unit 60 may be a capacitive structure, and may use the fingerprint identification electrodes to identify the fingerprint information. The fingerprint identification unit 60 may also be an optical sensitive structure, and may use the optical sensitive diodes to identify the fingerprint information. The working principle and the detailed structure may have many options, and are not limited by the present disclosure.

Figure 9:
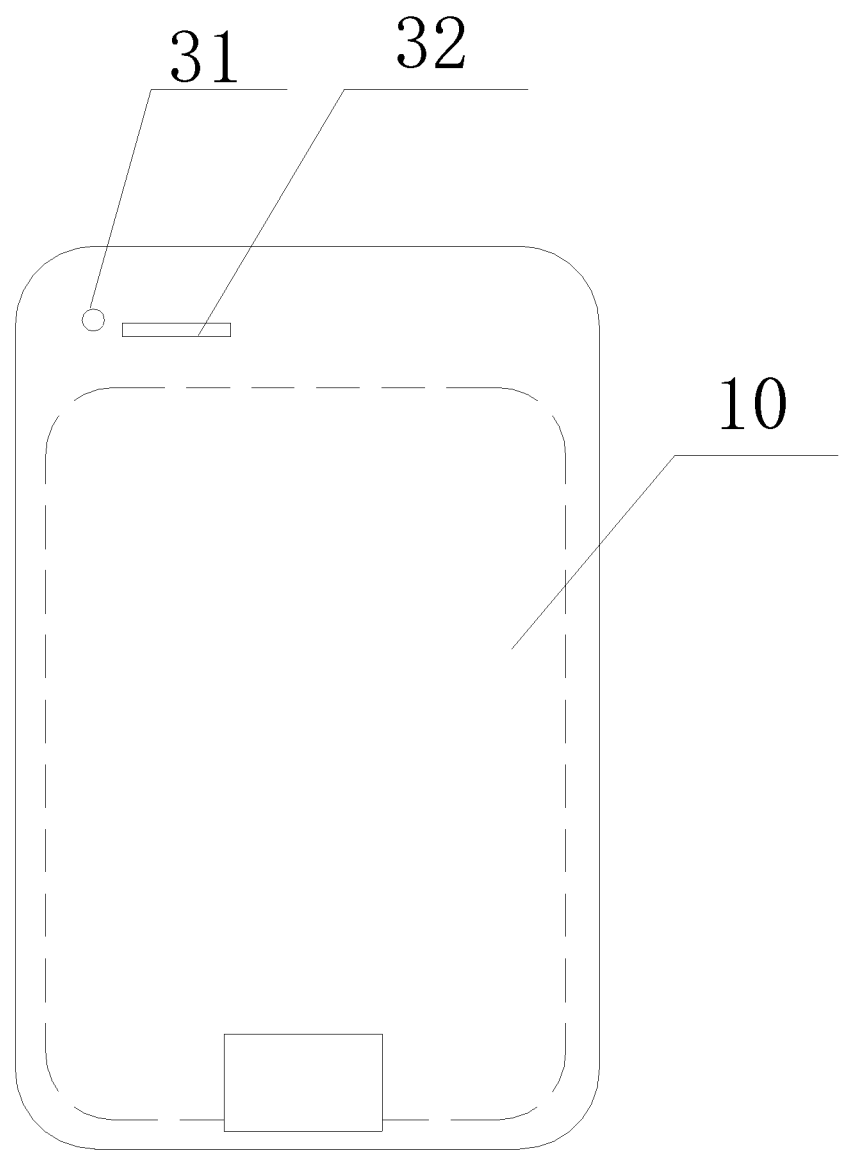
FIG. 9 illustrates an exemplary display apparatus consistent with various disclosed embodiments.

The present disclosure also provides a display apparatus. FIG. 9 illustrates a front view of an exemplary display apparatus consistent with various disclosed embodiments of the present disclosure. In one embodiment, as shown in FIG.

9, the display apparatus is a cellphone. The display apparatus may include a disclosed display panel. It is known to the skilled in the art that, besides the display panel, the display apparatus may also include other well-known structures. To avoid blurring the major aspects of the present disclosure, the further description of the well-known structures is omitted. Further, the display apparatus is not limited to the cellphone in FIG. 9, the display apparatus may also be a computer, a television, or an electronic book, etc.

Referring to FIG. 1 and FIG. 9, the present disclosure also provides another display apparatus. In one embodiment, a chip and/or a flexible circuit board may be bonded on the bonding region 40 of the display panel.

In particular, as shown in FIG. 1 and FIG. 9, the display apparatus may include a disclosed display panel. An integrated circuit (IC) chip or a flexible printed circuit (FPC) board may be bonded on the bonding region 40 of the display apparatus. Further, it is known to the skilled in the art that, besides the display panel, the display apparatus may also include other well-known structures.

Referring to FIG. 1 and FIG. 9, the present disclosure also provides another display apparatus. In one embodiment, a camera 31 and/or a headphone 32 may be disposed in the first groove 30.

In particular, as shown in FIG. 1 and FIG. 9, the display apparatus may include a disclosed display panel. In one embodiment, the camera 31 and/or the headphone 32 may be disposed in the first groove 30 of the display panel. Further, it is known to the skilled in the art that, besides the display panel, the display panel may also include other well-known structures.

According to the disclosed embodiments, the disclosed display panel and display apparatus may include at least following technical effects.

The non-display region 20 of the display panel may include at least one first groove 30. The bonding region 40 may provide a clearance space for the first groove 30. Certain device unit, such as a camera and/or a headphone, etc., may be installed in the first groove 30. Thus, the space of the non-display region 20 below the display region 10 may be effectively utilized, which may maximize the display region 10; and the screen-to-body ratio of the display apparatus where the display panel is installed may be increased.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A display panel, comprising:
 a display region including a first side and an opposite second side; and
 a non-display region surrounding the display region, the non-display region including a third side and an opposite fourth side along an outer edge of the display panel, and the fourth side of the non-display region being in parallel with the second side of the display region,
 wherein:
 the non-display region includes at least one first groove and a bonding region, both the at least one first groove and the bonding region being adjacently disposed, side-by-side along a first direction parallel with the second side of the display region, between the second side of the display region and the fourth side of the non-display region, the at least one first groove being enclosed by the non-display region, the at least one first groove not overlapping with the bonding region in a direction perpendicular to a surface of the display panel, and the bonding region being bonded with one of an integrated circuit and a flexible circuit board on the bonding region,
 along a thickness direction of the display panel, the at least one first groove penetrates through the display panel,
 one or more hardware units are installed in a region where the at least one first groove is located,
 the at least one first groove and the bonding region are disposed at a same side of the display region, and
 the non-display region of the display panel further includes a second groove, the second groove including a fingerprint identification unit and being at least partially enclosed by the display region of the display panel.

2. The display panel according to claim 1, wherein:
 along the thickness direction of the display panel, the second groove penetrates through the display panel; and
 the fingerprint identification unit is disposed in the second groove.

3. The display panel according to claim 1, further comprising:
 a base substrate and a plurality of film layers disposed on the base substrate,
 wherein:
 along the thickness direction of the display panel, the second groove penetrates through at least a portion of a film layer, and
 the fingerprint identification unit is disposed in a region of the display panel where the second groove is disposed.

4. The display panel according to claim 1, further comprising:
 a first border,
 wherein:
 the first border is recessed towards inside of the display panel to form the second groove; and
 the second groove is partially enclosed by the display region.

5. The display panel according to claim 1, wherein:
 the second groove is completely disposed at the display region.

6. The display panel according to claim 1, further comprising:
 a first border and a second border arranged opposite to each other along the first direction,
 wherein:
 a distance between the second groove and the first border is d1,
 a distance between the second groove and the second border is d2, and d1<d2, d1>0, and d2>0.

7. The display panel according to claim 1, further comprising:
 the bonding region is a stripe-shaped region extending along the first direction; and
 the bonding region has a first side and a second side arranged opposite to the first side along the first direction.

8. The display panel according to claim 1, wherein:
 the bonding region extends along a first direction;

along the first direction, a width of the display region is D1, and a width of the first groove is D2; and
20%*D1<D2<60%*D1.

9. The display panel according to claim 1, wherein:
the at least one first groove has one of a circular, an elliptical and a quadrangular shape.

10. The display panel according to claim 1, wherein:
the second groove has one of a circular, an elliptical and a quadrangular shape.

11. The display panel according to claim 1, wherein:
the fingerprint identification unit includes a plurality of fingerprint identification electrodes or a plurality of optical sensitive diodes.

12. A display apparatus, comprising:
a display panel,
wherein the display panel comprises:
a display region including a first side and an opposite second side, and
a non-display region surrounding the display region, the non-display region including a third side and an opposite fourth side along an outer edge of the display panel, and the fourth side of the non-display region being in parallel with the second side of the display region,
wherein:
the non-display region includes at least one first groove and a bonding region, both the at least one first groove and the bonding region being adjacently disposed, side-by-side along a first direction parallel with the second side of the display region, between the second side of the display region and the fourth side of the non-display region, the at least one first groove being enclosed by the non-display region, the at least one first groove not overlapping with the bonding region in a direction perpendicular to a surface of the display panel, and the bonding region being bonded with one of an integrated circuit and a flexible circuit board on the bonding region,
along a thickness direction of the display panel, the at least one first groove penetrates through the display panel,
one or more hardware units are installed in a region where the at least one first groove is located,
the at least one first groove and the bonding region are disposed at a same side of the display region, and
the non-display region of the display panel further includes a second groove, the second groove including a fingerprint identification unit and being at least partially enclosed by the display region of the display panel.

13. The display apparatus according to claim 12, wherein:
the one or more hardware units include at least one of a camera and a headphone.

14. The display apparatus according to claim 12, wherein:
the bonding region is a stripe-shaped region extending along the first direction; and
the bonding region has a first side and a second side arranged opposite to the first side along the first direction.

* * * * *